United States Patent [19]

Shaw et al.

[11] Patent Number: 4,879,904
[45] Date of Patent: Nov. 14, 1989

[54] IONIC CONDUCTIVITY ACCELEROMETER

[75] Inventors: John E. A. Shaw, West Drayton; Brian C. Webb, Sunbury, both of England

[73] Assignee: Thorn EMI PLC, London, England

[21] Appl. No.: 171,549

[22] Filed: Mar. 22, 1988

[30] Foreign Application Priority Data

Mar. 25, 1987 [GB] United Kingdom ................. 8707091

[51] Int. Cl.$^4$ ....................... G01P 15/08; G01P 15/12
[52] U.S. Cl. ................................................ 73/517 R
[58] Field of Search .......................... 73/516 R, 517 R; 324/162, 459; 357/65; 204/421

[56] References Cited

U.S. PATENT DOCUMENTS 3,170,817  2/1965  Mrgudich ........................... 73/517 R
4,188,266  2/1980  Forman ................................ 204/421
4,421,787  12/1983  Ikezawa et al. ..................... 204/421

FOREIGN PATENT DOCUMENTS 0146801  11/1984  European Pat. Off. .
2054167A  2/1981  United Kingdom .

Primary Examiner—Tom Noland
Assistant Examiner—Robert P. Bell
Attorney, Agent, or Firm—Fleit, Jacobson, Cohn, Price, Holman & Stern

[57] ABSTRACT

An ionic conductivity accelerometer comprises a layer of an ionically conductive material such as rubidium silver iodide ($RbAg_4I_5$) deposited on an electrically insulative substrate with spaced electrodes in contact with the layer. The ionically conductive material may be mixed with an electrically insulative, chemically inert material such as quartz wool in order to alleviate susceptibility to cracking.

7 Claims, 3 Drawing Sheets

IONIC CONDUCTIVITY ACCELEROMETER

This invention relates to a device for the electrical measurement of acceleration, in particular to a device for the measurement of acceleration by means of an ionic conductor.

It is known that an acceleration can produce an e.m.f. in conductors. The effect is dependent on the mass/charge ratio of the conducting species and has been demonstrated both in ionic solutions and metal conductors. One known solid state ionic conductor is rubidium silver iodide ($RbAg_4I_5$) and other solid state ionic conductors include beta-alumina and certain conducting glasses.

European Patent Application No. 146801 discloses a device for measuring a linear acceleration. This device, which is illustrated in FIG. 1 of the accompanying drawings, comprises an elongate solid state ionic conductor 1 contained in a hollow electrically insulating tube 2 and having electrodes 3,4 at either end. An acceleration having a component along the axis of the tube produces relative movement of the ions in the opposite direction to that of the acceleration, thereby generating an e.m.f. between electrodes 3,4 which is proportional to the acceleration and to the length of the ionic conductor.

One object of the present invention is to provide an ionic conductor based accelerometer suitable for navigation purposes in air-borne vehicles. Desirably, the accelerometer should be small, robust and light weight.

Another object is to produce a low-cost accelerometer with integral amplifier suitable for mass-production by standard semiconductor hybrid or monolithic techniques.

Accordingly, there is provided a device for measuring acceleration comprising an electrically insulative substrate, an ionically conductive layer on the substrate and spaced apart electrodes in contact with said layer.

The inventors find that a device as defined, wherein said ionically conductive material is contained in a layer, can be configured as a relatively compact, light-weight and robust device suitable for use in particularly demanding applications, as encountered, for example, in an air-borne vehicle.

In an embodiment said ionically-conductive layer may be configured as an elongate strip interconnecting a pair of electrodes. In another embodiment said ionically conductive layer comprises a composite layer containing an ionically conductive material and an electrically insulative, chemically inert material, and, preferably containing from 70% to 90% by solid volume of said ionically conductive material, the balance (i.e. from 30% to 10% by solid volume) being of an electrically insulative inert material. The inventors have found that said electrically insulative material is a particularly beneficial constituent which renders said layer substantially resistant to cracking.

Said ionically conductive material is preferably rubidium silver iodide ($RbAg_4I_5$) and said electrically insulative inert material may be selected from oxides of aluminium, silicon or magnesium. The insulative material may be of particulate or fibrous form, the diameter of the particles or fibres used being preferably no greater than 200 μm.

In another embodiment, a low-noise J-FET amplifier may be respectively mounted, or fabricated, on said substrate using semiconductor hybrid, or monolithic, techniques, known to those skilled in the art.

The inventors have found that there may be a problem in producing crack-free layers of an ionic conductor on some electrically insulating substrates and the inventors have discovered that this problem is alleviated if the aforementioned inert material is included in the layer. Preferably the inert material comprises quartz wool having strands of less than 200 μm diameter.

This invention provides a small, robust, light-weight accelerometer without moving parts, suitable for use on an air-borne vehicle, and having a fast and linear response over a wide range of acceleration. The invention also provides a low-cost accelerometer with integral amplifier suitable for mass-production by hybrid or monolithic semiconductor techniques.

In order that the invention may be carried readily into effect particular embodiments thereof are now described, by way of example only, by reference to the accompanying drawings of which, FIG. 1 illustrates a longitudinal, cross-sectional view through a known ionically conductive accelerometer, FIG. 2 illustrates a perspective view of a hybrid, ionically conductive accelerometer in accordance with the present invention, FIG. 3 illustrates a perspective view of a monolithic ionically conductive accelerometer in accordance with the present invention, FIG. 4 illustrates an ionically conductive accelerometer incorporating a series arrangement of ionically conductive strips.

Figure 1:
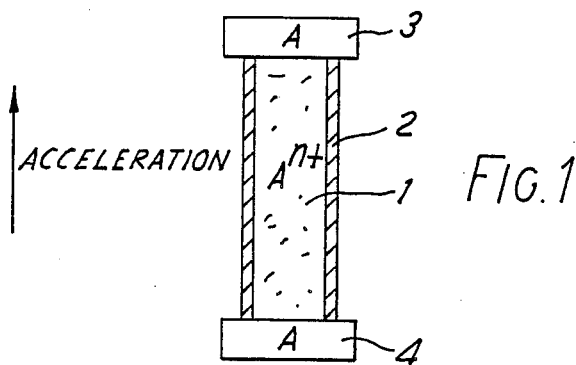
Figure 2:
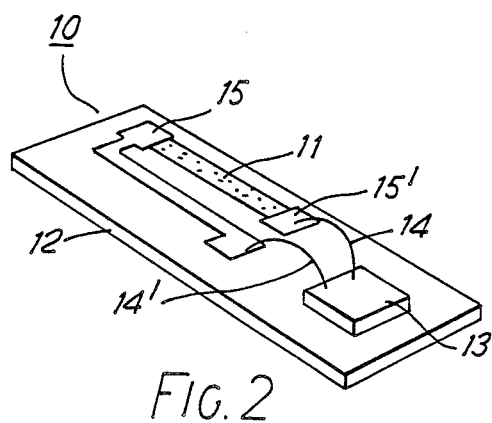
Figure 3:
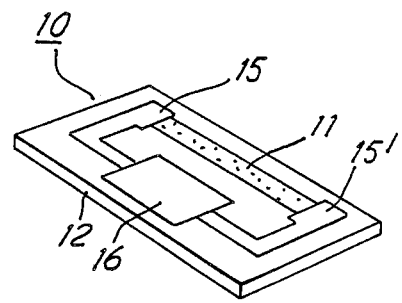

Referring to FIG. 2 of the drawings, an ionically conductive accelerometer, shown generally at 10, comprises a layer 11 of an ionically conductive material—in this case rubidium silver iodide ($RbAg_4I_5$)—deposited as an elongate strip on a substrate 12 of an electrically insulative material such as alumina, for example. In this example, the accelerometer is of a hybrid construction with an amplifier, in the form of an integrated circuit 13, being mounted on the substrate and being connected by respective lead wires 14, 14' to respective metallisations 15, 15', typically of silver, contacting opposite ends of the strip. In an alternative example, shown in FIG. 3, the accelerometer has a monolithic construction, the strip, metallisations and amplifier (i.e. a low noise J-FET) being fabricated on a common substrate 16 of a semiconductor material having an electrically insulative surface layer.

The inventors find that a construction of this kind, wherein the ionically conductive material is provided as a layer, offers a light-weight, compact and robust configuration suitable for use in many demanding environments, as may be encountered, for example, in an airborne vehicle. It is found, however, that a layer formed solely from an ionically conductive material such as rubidium silver iodide may be susceptible to cracking which could prove to be troublesome in some operational situations. The inventors have discovered, however, that inclusion of an inert, electrically insulative material, such as an oxide of silicon, aluminium or magnesium renders the layer substantially resistant to cracking.

In a typical example layer 11 is a composite comprising 80% by solid volume of rubidium silver iodide and 20% by solid volume of silicon dioxide, in the form of quartz wool. Since the specific gravities of these materials are 5.3 and 2.4 respectively the required proportions, by weight, are 89.83% of rubidium silver iodide and 10.17% of silicon dioxide. This composite may conveniently be prepared by mixing 16.57% by weight of RbI, 73.26% by weight of AgI and 10.17% by weight of $SiO_2$ with a suitable carrier liquid such as Butanol thereby to form an ink. The ink may be painted, or alternatively silk screen printed onto substrate 12. The carrier liquid is fired off at about 150° C. and the layer then heated to a temperature above the melting temperature (250° C.) of rubidium silver iodide, to ensure that the melt makes good contact with the quartz wool.

In order to reduce the effect of electrical noise which may be significant especially if a relatively small acceleration is being measured it is desirable that layer 11 should have as small a resistance as possible. In the case of a hybrid arrangement layer 11 would normally have a thickness within the range 0.01 to 0.5 mm and could be applied using thick film techniques, as described hereinbefore. Alternatively, for example in a monolithic arrangement, layer 11 may be applied by a thin film technique—such as vacuum deposition, and so would have a much smaller thickness, of the order of a micron or so, and a much higher electrical resistance and noise level. A thin film arrangement, therefore, would in general be more suitable for measuring relatively large accelerations.

Figure 4:
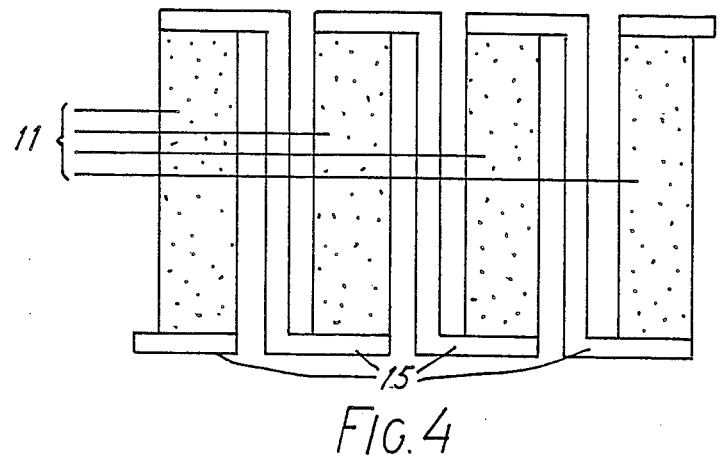

In an example of a hybrid construction three strips of rubidium silver iodide each 30 mm long, 8 mm wide and 0.4 mm thick were connected in series to give a total effective length of 90 mm and a total resistance of 2.94 kΩ. FIG. 4 illustrates a configuration having four ionically conductive strips 11 connected together serially by connectors 15.

Figure 5:
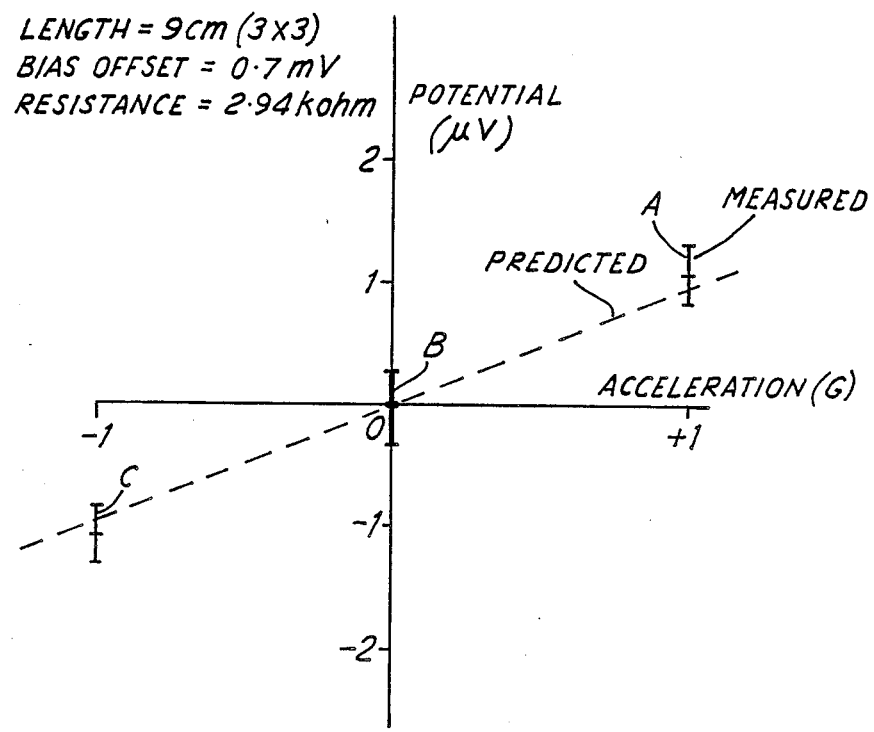
FIG. 5 illustrates a response obtained from an accelerometer having three ionically conductive strips each 3 cm in length, giving a total length of 9 cm.

The measured and predicted responses for rotations from +1G (vertical) to zero G (horizontal) to −1G (inverted vertical) to zero G to +1G etc. are represented by the vertical lines A, B and C and by the dashed curve respectively in FIG. 5. A small bias voltage (0.70 mV) was observed and this was compensated for in the measurements by application of an appropriate offset voltage to the buffered output.

It will be appreciated that other ionically conducting materials such as beta-aluminium oxide could be used, but in general they would have a higher electrical resistivity than rubidium silver iodide. Possible alternative materials include other silver iodine compounds; for example, silver iodine phosphate ($Ag_{19}I_{15}P_2O_7$) and silver mercury sulphur iodide ($Ag_{2.4}S_{0.6}Hg_{0.4}I_{1.6}$) and sodium beta-alumina ($Na_2O.11Al_2O_3$), though all these materials have higher resistivites than silver rubidium iodide. In the case of beta-alumina, the conducting ions (sodium) have lower mass than silver ions, giving a relatively low sensitivity.

Other electrically insulating materials which are stable up to at least the temperature at which intimate contact with the ionic conductor occurs could be used instead of quartz wool; for example; aluminium or magnesium oxides or certain alumino-silicates or glassy materials. Preferably these materials should have a particle (or fibre) diameter less than about 200 μm.

In some applications, use of a flexible substrate material, such as polyimide, has advantages. In one example, several accelerometer elements are formed in a geometrically parallel arrangement, similar to that shown in FIG. 4, on a flexible substrate. The elements are arranged transverse to the length of the substrate, which is rolled up to fit into a small space or wrapped around a small object. The elements may be connected in series (as shown in FIG. 4) and/or in parallel to give the optimum compromise between sensitivity and resistance for the particular application. For example, four pairs of series-connected elements connected in parallel would give twice the sensitivity and half the resistance of a single element.

Figure 6:
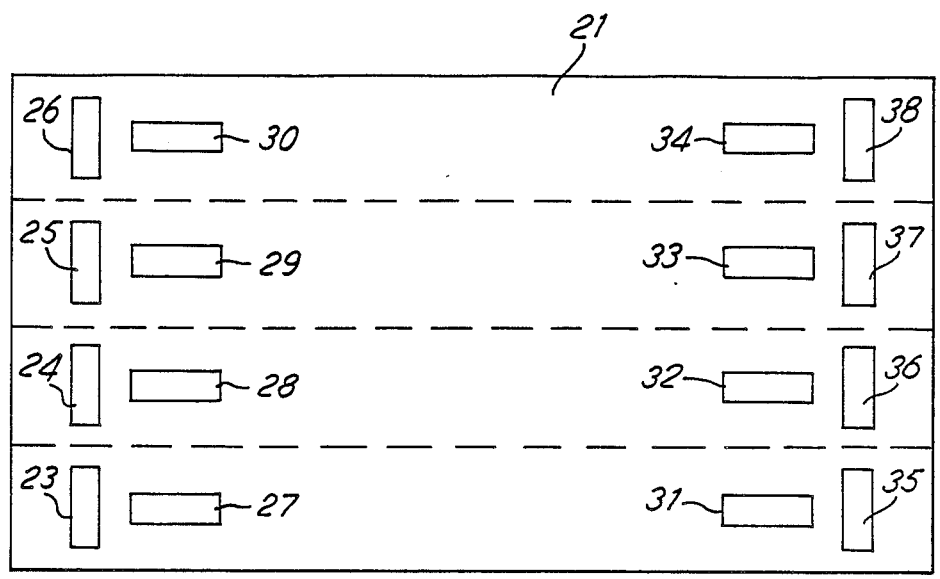
FIG. 6 illustrates an arrangement of multifunctional accelerometers on a flexible substrate and FIG. 7 illustrates this arrangement when wound around a cylindrical mandrel.
Figure 7:
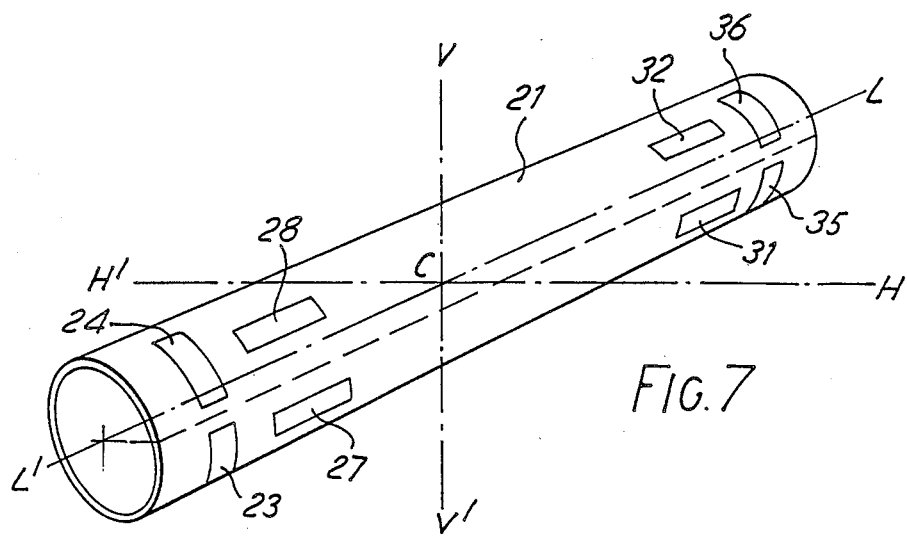

In another example of the use of a flexible substrate, several measurements are made simultaneously by means of accelerometers in different locations responsive in different directions. One arrangement is shown in FIGS. 6, 7. Accelerometers 23-38 (which may comprise single or multiple elements) are formed on a flexible substrate 21, as shown in FIG. 6. The substrate 21 is then wound around a cylindrical mandrel 22, the width of the substrate being just sufficient for the two sides to meet around the mandrel. If we assume that all accelerations of the object can be resolved into linear accelerations along the three axes L'L, H'H, V'V through the centre C of the mandrel and rotations about these axes, a variety of measurements can be made by appropriate processing of the output voltages from the accelerometers. The accelerometers are arranged symmetrically in the four quadrants around the cylinder and after amplification the outputs are weighted by appropriate weighting factors to equalise their sensitivities. The measurements listed in Table 1 can then be carried out by combining the output voltages produced by appropriate combinations of accelerometers in the manner indicated. It is assumed that accelerations occurring in the same vertical or horizontal directions in FIG. 6, that is, in the same longitudinal direction, or in the same rotational sense about the axis of mandrel 22 in FIG. 7, give rise to the same polarity of output voltage.

TABLE 1

| Measurement | Procedure |
| --- | --- |
| Linear acceleration along L'L | (27+28+29+30) + (31+32+33+34) |
| Linear acceleration along V'V | (23+24−25−26) + (35+36−37−38) |
| Linear acceleration along H'H | (26+23−24−25) + (38+35−36−37) |
| Angular acceleration about L'L | (23+24+25+26) + (35+36+37+38) |
| Angular acceleration about V'V | (26+23−24−25) − (38+35−36−37) |
| Angular acceleration about H'H | (23+24−25−26) − (35+36−37−38) |
| Centrifugal acceleration (square of angular velocity) about H'H and/or V'V | (27+28+29+30) − (31+32+33+34) |

In practice the amplified and weighted outputs from the accelerometers could be fed to appropriate logic circuits effective to process the output signals produced by different combinations of accelerometers, or the output signals could be digitised and stored for digital processing. Alternatively, the accelerometers forming a group could be used solely to measure a one specific acceleration. Appropriate adjacent accelerometers could then be confibgured as a single unit.

It will be understood that linear and angular velocities can be derived by integration of the corresponding accelerations and the corresponding displacements can be derived by a second integration.

It will be appreciated that the accelerometers could be configured in shapes other than straight strips for specific measurements. For example, a circle broken so that electrodes can be inserted, or a spiral, would be responsive to the component of angular acceleration about an axis through the centre of the circle or spiral and perpendicular to the plane of the circle or spiral.

To protect the device from interference from potentials generated by passage through magnetic fields, it may be advantageous to encapsulate the device with a material incorporating a magnetic screening. Depending on the application the encapsulation could comprise part of the device packaging, or might be achieved by first coating the device with a conformal insulator, i.e. polyimide, and then with a film of a ferromagnetic material, e.g. by evaporation.

Interference due to pickup at the output of the device may be alleviated by converting the output signal from analog to digital form within the device package.

We claim:

1. A device for measuring acceleration comprising: an electrically insulative substrate; an ionically conductive layer, said layer comprising a composite layer containing an ionically conductive material and an electrically insulative inert material; and spaced apart electrodes in contact with said layer; wherein acceleration of said device is indicated by an e.m.f. generated between said spaced apart electrodes.

2. A device according to claim 1 wherein said ionically conductive layer is configured as an elongate strip interconnecting a pair of electrodes.

3. A device according to claim 1 wherein said composite layer contains from 70% to 90% by solid volume of said ionically conductive material, the balance being of said inert electrically insulative material.

4. A device according to claim 1 wherein said ionically conductive material is rubidium silver iodide.

5. A device according to claim 1 wherein said electrically insulative inert material is selected from the oxides of aluminium, silicon or magnesium.

6. An accelerometer arrangement comprising a plurality of devices each according to claim 1, the arrangement further comprising a processing circuit for operating on different selected combinations of output signals produced by the devices.

7. An accelerometer arrangement comprising a plurality of devices each according to claim 1, the arrangement further comprising a processing circuit for operating on the output signals produced by said plurality of devices.

* * * * *